United States Patent [19]

Jusinskas, Jr. et al.

[11] 4,190,745
[45] Feb. 26, 1980

[54] CALL FOR SERVICE AND CONTINUITY SENSOR CIRCUIT

[75] Inventors: Julius Jusinskas, Jr., Glen Ellyn, Ill.; David Q. Lee, Boca Raton, Fla.; Richard M. Rovnyak, Schaumburg, Ill.

[73] Assignee: GTE Automatic Electric Laboratories Incorporated, Northlake, Ill.

[21] Appl. No.: 965,713

[22] Filed: Dec. 1, 1978

[51] Int. Cl.² ............................................. H04M 7/14
[52] U.S. Cl. ............................................. 179/18 AH
[58] Field of Search ...................... 179/18 AH, 18 AB

[56] References Cited

U.S. PATENT DOCUMENTS

| | | | |
|---|---|---|---|
| 4,126,765 | 11/1978 | Calder et al. | 179/18 AH |
| 4,133,982 | 1/1979 | Lee et al. | 179/18 AH |

Primary Examiner—Thomas W. Brown

[57] ABSTRACT

A call for service and continuity sensor circuit for use in conjunction with a trunk circuit of a digital PABX telephone system interfacing with a central office via ground start signalling providing for detection of a call for service signal to the PABX by the central office. This circuit also provides the means to effect an open circuit for both signalling and transmission conditions in order to prevent excess loading of the trunk circuit during these conditions. This circuit provides a precise and stable threshold detection level necessary for accurate sensing of the trunk circuit conditions mentioned above despite parasitic leakage current, induced longitudinal power line voltages, and earth potentials sometimes existing on the line connecting the PABX to the central office.

10 Claims, 1 Drawing Figure

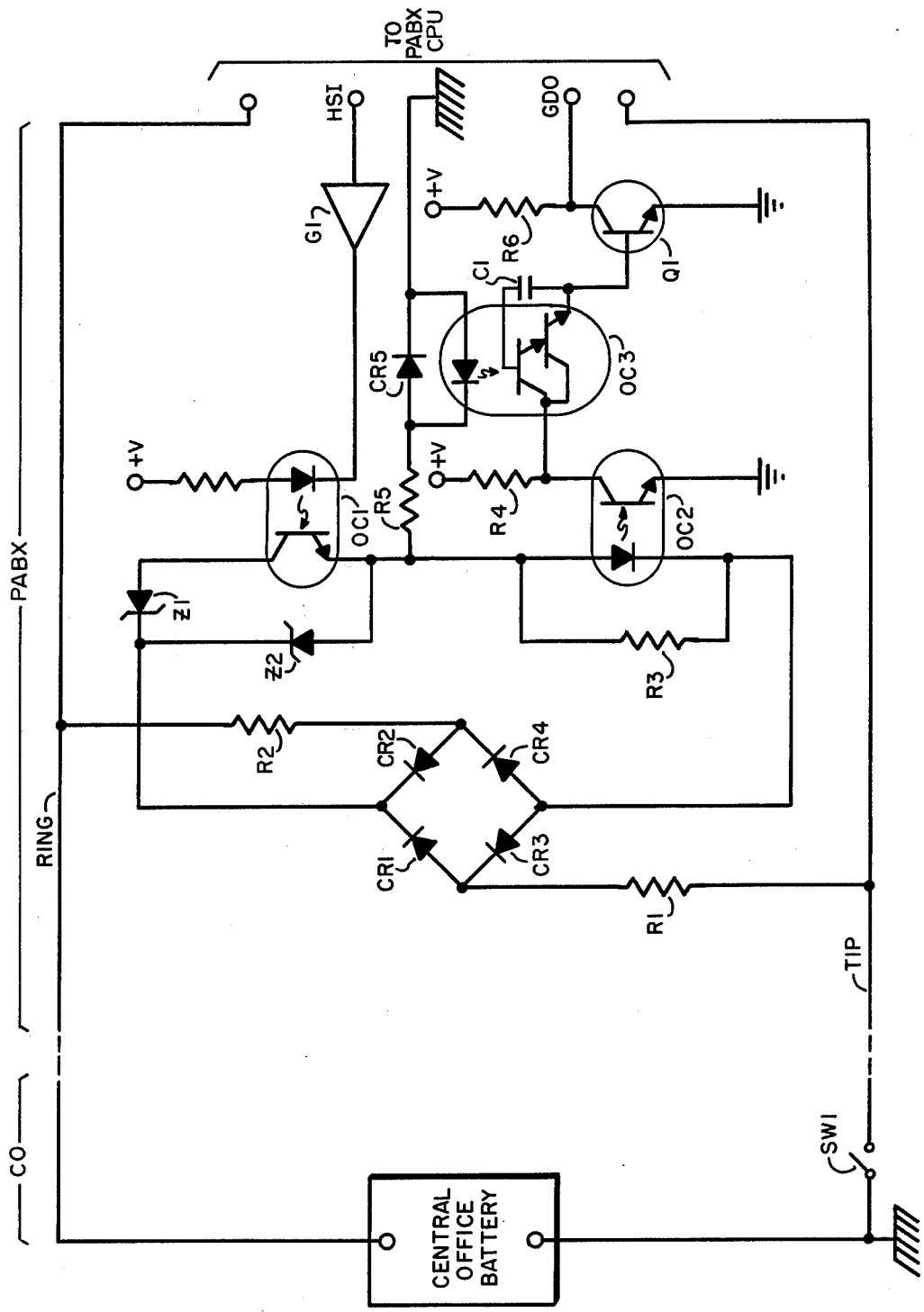

CALL FOR SERVICE AND CONTINUITY SENSOR CIRCUIT

BACKGROUND OF THE INVENTION (1) Field of the Invention

The present invention relates to telephone trunk circuits and more particularly to a sensor circuit for use in a digital private automatic branch exchange, to detect supervisory signals between a PABX and a central office. The present circuit designed for inclusion in a PABX trunk circuit, provides detection of incoming and outgoing call for service signals in a ground start configuration and detects continuity of the loop between the central office and the trunk circuit.

(2) Description of the Prior Art

In a telephone system it is necessary that supervisory signals be sent via a trunk circuit from a PABX to a central office and from the central office to the PABX. For example, one of these signals indicates that a call for service has been received. This signalling is accomplished by applying an earth ground to the tip lead of the trunk circuit.

Existing trunk circuits typically sense the application of such supervisory signals by the use of polar relays. Such polar relays are expensive, consume relatively large amounts of space and are generally of a lower impedance then desirable. Polar relays are generally unusable for trunk circuits in electronic digital PABX's because of their size, low impedance and slow speed of operation.

In addition, a central office can request that the PABX transmit the calling or called number via other supervisory signals. This supervisory signalling is accomplished by battery polarity reversals applied at the central office to the tip and ring leads of the trunk circuit. For economic reasons, it is desirable that the above mentioned functions be combined into a single circuit for use by an electronic digital PABX.

A partial solution to these problems is taught by U.S. Pat. No. 3,849,605 issued to S. L. Russell, on Nov. 19, 1974, which demonstrates the use of a high voltage diode bridge rectifier circuit and an optical coupler including a light emitting diode and signal photo sensitive transistor. The circuit described therein teaches only a continuity sensor. Furthermore, the solid state continuity check circuit described in the Russell patent must be switched into and out of the tip and ring loop by the operation of switching relays in order to avoid distortion during voice transmission. This solution is prohibitive because it is dependent upon the slower operating control of relay contacts.

Therefore, it is an objective of the present invention to provide a combined call for service and continuity sensor for detection of the supervisory signals transmitted from a central office to a PABX which has negative ring lead parity checking and enhanced longitudinal voltage immunity. In addition, it is an objective of the present invention to provide an electronic digital PABX with the capability to disable the sensor circuit for voice transmission.

Furthermore, it is an objective of the present invention in addition to meeting all the objectives mentioned above to meet the specifications for a registered protective coupler. The criteria for a registered protective coupler are set forth in *Part 68 of the Federal Communication Commission Rules.*

SUMMARY OF THE INVENTION

The present invention consists of a sensor circuit for use in an electronic digital PABX trunk circuit for sensing a call for service and the continuity of loop closure of the trunk circuit. This circuit includes a balanced resistive network connected between a tip and ring leads of the trunk circuit. A diode bridge circuit is connected between the resistive network and three optical coupler devices. A first zener diode is connected between the first optical coupler and the diode bridge. Also, a second zener diode is connected in shunt with the collector and emitter of a photo-transistor of the first optical coupler. The second optical coupler has a current limiting resistor connected in shunt with its light emitting diode. This resistor is functionally trimmed to obtain a precise turn-on threshold of the light emitting diode.

A high impedance resistor connects the common connection of the first and second optical couplers with a third optical coupler and a diode. The output signal of the third optical coupler is transmitted to the PABX via an amplification transistor connected between the third optical coupler and the PABX. In addition, the PABX is connected to the first optical coupler through an inverter gate and the signal transmitted through said inverter gate renders the sensor circuit an open circuit for the voice transmission condition of the line.

When the central office applies a battery of normal polarity (positive tip lead and negative ring lead) and the ground start switch at the central office is closed, the resultant current flow is such that the second optical coupler device is activated thereby indicating the presence of a continuous loop between the central office and the trunk circuit.

The third optical coupler device has its light emitting diode connected from earth ground through a high resistance to the diode bridge circuit in a longitudinally balanced configuration. The light emitting diode's polarity is such that it will be activated when the ring lead is connected to a negative potential battery at the central office and the tip lead is open at the central office. In addition, the third optical coupler device "AND's" the indication of the detected negative ring lead with the signal representing no loop continuity sensed via the second optical coupler to produce an output signal. This output signal is coupled to an amplification transistor, and subsequently is transmitted to the PABX. This signal changes from a value of logic 1 to logic 0 for the simultaneous detection of the negative ring lead and no loop continuity indicating the trunk is actually idle and available to the PABX to access the central office.

DESCRIPTION OF THE DRAWING

The single sheet of drawings included herewith comprises a schematic diagram of a call for service and continuity sensor circuit emboding the principles of operation of the present invention.

DESCRIPTION OF THE PREFERRED EMBODIMENT

The drawing included schematically shows the call for service and continuity sensor circuit connected between the TIP lead and the RING lead of a trunk circuit connecting a PABX and a telephone central office. The trunk circuit is connected to the central office in ground start configuration as shown by switch SW1. This sensor circuit includes a balanced resistive network comprising resistor R1 connected to the TIP lead and resistor R2 connected to the RING lead. Resistor R1 is a thick film resistor and is balanced to the value of resistor R2 by dynamic functional trimming with a laser.

A diode bridge circuit consisting of diodes CR1, CR2, CR3 and CR4 connected between resistors R1 and R2. Optical coupler OC1 is connected to the diode bridge circuit through zener diode Z1 and is also connected to the PABX via inverter gate G1.

A second optical coupler OC2 is connected to the diode bridge circuit and to optical coupler OC1. A zener diode Z2 is series connected with a thick film resistor R3 and that combination is connected in shunt with the output terminals of the diode bridge circuit. Resistor R3 is a thick film resistor used to control the precise turn-on current of optical coupler OC2. The value of this resistor is dynamically adjusted to set a threshold turn-on for optical coupler OC2 by functionally trimming resistor R3 using laser cutting techniques. Zener diode Z2 functions to protect optical coupler OC1 from high voltage surges in the telephone line.

A high impedance resistor R5 is connected to the common connection of zener diode Z2, resistor R3, optical coupler OC1 and optical coupler OC2. Resistor R5 is connected to earth ground through diode CR5. Diode CR5 is shunt connected (cathode to anode) with the light emitting diode of optical coupler OC3. Capacitor C1 is connected between the input base and the output emitter of optical coupler OC3 and provides enhanced rejection of power line induced longitudinal voltages.

The collector of the photo-transistor included in optical coupler OC3 is connected to the collector of optical coupler OC2 and the emitter of the output transistor of OC3 is connected to the base of amplification transistor Q1. Lastly, the collector output of transistor Q1 is connected to the PABX and provides a signal which changes state for the detection of a call for service and loop continuity between the central office and the trunk circuit.

When the central office seizes the trunk circuit switch SW1 is closed, thereby completing a loop between the office and the trunk circuit. In addition, a call for service is signalled by the central office placing negative battery on the ring lead and having the positive battery connected to earth ground as shown. Current then flows from the battery along the TIP lead through resistor R1, diode CR1, zener diode Z1, optical coupler OC1, through the light emitting diode of optical coupler OC2, diode CR4, resistor R2 and returns to the central office via the RING lead. The light emitting diode of optical coupler OC1 is normally conducting current thereby activating its associated optical coupler. The current conduction through the light emitting diode of optical coupler OC2, as mentioned above, indicates the presence of a complete loop between the central office and the trunk cirucit. In response to a complete loop optical coupler OC2 is activated thereby causing current to flow from the voltage source through resistor R4 to the collector of its included photo-transistor and from the emitter of the photo-transistor to electronic ground. The collector or optical coupler OC2 will go to ground state cutting off current to the base of transistor Q1 and output GD0 will be of logic "1" value.

In the configuration outlined above, a suitable longitudinally balanced loop condition relative to earth ground is maintained. In order for the PABX to identify a trunk as idle in the case where the PABX wants to call the central office, two conditions must exist, namely: (1) tip lead is open at the central office and (2) the ring lead from the central office is negative. In this case, OC3 is activated via negative ring lead and functions as an "AND" gate to combine the open circuit condition detected by optical coupler OC2 with the detected negative ring lead to produce a signal. This signal is transmitted to the base of transistor Q1, causing current to flow from the voltage source through resistor R6, the collector-emitter path of transistor Q1 and to electronic ground. As a result output signal GD0 makes a state transition from a logic "1" to a logic "0" indicating true availability for seizure and use by the PABX to call the central office.

When the PABX establishes the telephone call via the ring and tip leads, this sensor circuit is disabled under control of the PABX for purposes of voice transmission. This is accomplished by zener Z1 because the PABX load is now a low voltage load.

By placing a logic "1" signal on the input lead HSI, optical coupler OC1 is turned off, thereby eliminating any load from the line due to this circuit. This terminates current flow through the light emitting diode of optical coupler OC1, thereby deactivating OC1. Therefore, only the high impedance of resistor R5 is seen across the tip and ring leads which is necessary for certain signalling methods.

Although a preferred embodiment of the invention has been illustrated, and that formed described in detail, it will be readily apparent to those skilled in the art that various modifications may be made therein without departing from the spirit of the invention or from the scope of the appended claims.

What is claimed is:

1. A call for service and continuity sensor circuit for use in a trunk circuit of a telephone system including at least first and second switching centers connected via said trunk circuit in ground start configuration, said trunk circuit having first and second leads connecting said switching centers, said call for service and continuity sensor circuit comprising:

current direction means connected between said first and said second leads of said trunk circuit;

circuit switching means connected between said current direction means and said second switching center and including gating means connected to said second switching center and a first optical coupler device connected between said current direction means and said gating means, operated in response to an input signal from said second switching center to disable said call for service and continuity sensor circuit;

continuity detection means for detecting a non-continuous loop between said first and second switching centers, connected between said current direction means and said circuit switching means, said continuity detection means including a second optical coupler device connected between said current direction means and said first optical coupler device, operated in response to a non-continuous open loop circuit connection of said first lead at said first switching center to produce a first output signal; and polarity detection means for detecting a negative potential on said second lead, representing a call for service, and connected between said continuity detection means and said second switching center, said polarity detection means operated in response to said negative potential to produce a second output signal representative of said negative potential and operated to combine said first and said second output signals to produce and to transmit a third output signal to said second switching center.

2. A call for service and continuity sensor circuit as claimed in claim 1, wherein: said current direction means comprises a diode bridge array.

3. A call for service and continuity sensor circuit as claimed in claim 2, wherein: said current direction means further includes first and second resistors, said first and said second resistors are connected between said diode array and said first and second leads respectively and are of high impedance and of equal value; said first resistor constructed using thick film techniques and made equal in resistance to said second resistor by laser trimming.

4. A call for service and continuity sensor circuit as claimed in claim 1, wherein: said circuit switching means further includes first and second zener diodes, said second zener diode connected in shunt with said first optical coupler device and said first zener diode having its cathode connected to the common connection of said second zener diode and said first optical coupler and its anode connected to said current direction means, said circuit switching means operated in response to an input signal level shift to render said call for service and continuity sensor circuit an open circuit during voice and supervisory signal transmissions via said first and said second leads.

5. A call for service and continuity sensor circuit as claimed in claim 1, wherein: said continuity detection means second optical coupler device has a light emitting diode and a photo-transistor and a resistor connected in shunt with said light emitting diode, said second optical coupler device operated in response to a voltage applied across said first and said second leads by said first switching center to produce a precise turn-on voltage and current for said second optical coupler device.

6. A call for service and continuity sensor circuit as claimed in claim 5, wherein: said resistor is produced by thick film techniques, and dynamically adjusted to provide said precise voltage and current thresholds by functional trimming of said resistor via laser techniques.

7. A call for service and continuity sensor circuit as claimed in claim 1, wherein: there is further included a resistor of high resistance connected between said continuity detection means and said polarity detection means for producing a longitudinally balanced loop condition relative to earth ground.

8. A call for service and continuity sensor circuit as claimed in claim 1, wherein: said polarity detection means includes a third optical coupler device having a light emitting diode and photo-transistors connected in cascade and a diode shunt connected with said light emitting diode, said photo-transistor connected to said continuity detection means.

9. A call for service and continuity sensor polarity as claimed in claim 8, wherein: said circuit detection means further includes a transistor connected between said third optical coupler device and said second switching center, operated in response to said third optical coupler device to produce an amplified output signal suitable for transmission to said second switching center.

10. A call for service and continuity sensor circuit as claimed in claim 8, wherein: there is further included a capacitor connected between the base of one of said photo-transistors and the collector of said other photo-transistor of said third optical coupler for providing for rejection of induced longitudinal voltages due to power lines.

* * * * *